United States Patent [19]

Park

[11] Patent Number: 5,378,358
[45] Date of Patent: Jan. 3, 1995

[54] FUEL PROCESSING UNIT

[76] Inventor: Robert Park, 1 Mohican Pl., Lake Hiawatha, N.J. 07034

[21] Appl. No.: 58,263

[22] Filed: May 10, 1993

[51] Int. Cl.⁶ .......................................... B01D 17/028
[52] U.S. Cl. ................... 210/187; 210/259; 210/305; 210/316; 210/519; 210/521; 210/532.1
[58] Field of Search ............... 210/184, 185, 187, 305, 210/311, 316, 259, 519, 521, 532.1, 533; 123/557; 219/205, 207; 138/33

[56] References Cited

U.S. PATENT DOCUMENTS

| | | | |
|---|---|---|---|
| 1,172,728 | 2/1916 | Perkins | 210/305 |
| 1,675,775 | 7/1928 | Umbarger | 210/187 |
| 1,875,176 | 8/1932 | Mitchell | 219/205 |
| 4,059,520 | 11/1977 | Roller | 210/184 |
| 4,264,442 | 4/1981 | Jackson | 210/86 |
| 4,329,226 | 5/1982 | Thompson | 210/180 |
| 4,354,946 | 10/1982 | Warlick et al. | 210/774 |
| 4,368,716 | 1/1983 | Davis | 123/557 |
| 4,372,279 | 2/1983 | Parks | 219/205 |
| 4,417,133 | 11/1983 | Sanner | 219/205 |
| 4,421,090 | 12/1983 | Davis | 123/557 |
| 4,428,351 | 1/1984 | Davis | 123/557 |
| 4,443,334 | 4/1984 | Shugarman et al. | 210/168 |
| 4,495,069 | 1/1985 | Davis | 210/114 |
| 4,502,955 | 3/1985 | Schaupp | 210/149 |
| 4,539,109 | 9/1985 | Davis | 210/104 |
| 4,612,897 | 9/1986 | Davis | 123/557 |
| 4,629,560 | 12/1986 | Harris | 210/184 |
| 4,676,895 | 6/1987 | Davis | 210/184 |
| 4,680,110 | 7/1987 | Davis | 210/114 |
| 4,866,250 | 9/1989 | Pasbrig | 219/229 |
| 4,878,536 | 11/1989 | Stenlund | 165/119 |
| 4,976,852 | 12/1990 | Janik et al. | 210/86 |

FOREIGN PATENT DOCUMENTS 3727577 3/1989 Germany ..................... 219/205

OTHER PUBLICATIONS

Product insert, Diesel-Pro, date unknown.
Service Bulletin, Davco, 3 pages, date unknown.
Davco Catalog, 11 pages, date unknown.

Primary Examiner—Matthew O. Savage
Attorney, Agent, or Firm—Thomas L. Adams

[57] ABSTRACT

A fuel processing unit can dewater and heat fuel before delivery to a filter. The unit has a housing with a settling chamber and an inlet communicating with the chamber. The housing has a filter connection adapted to connect the filter in series with the chamber. The unit also has a heater cable with a predetermined length. The heater cable extends from the chamber through the inlet and outside the housing.

16 Claims, 3 Drawing Sheets

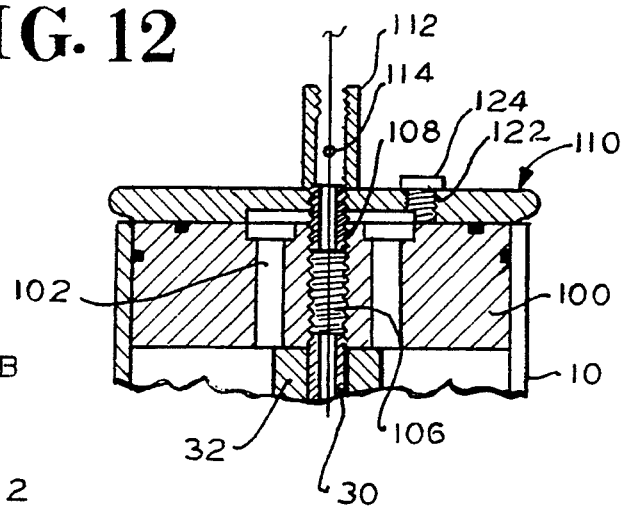
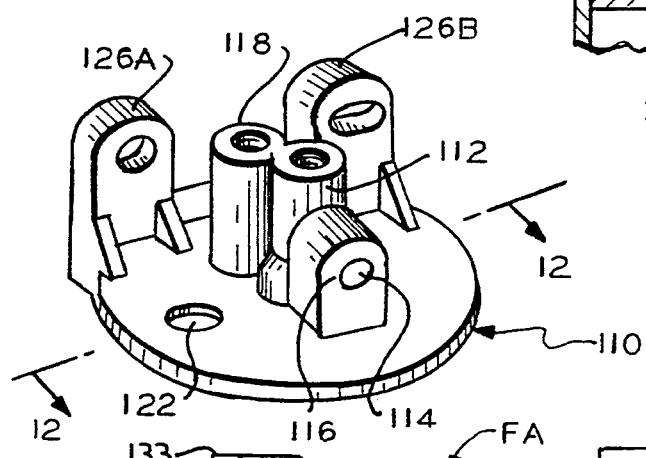
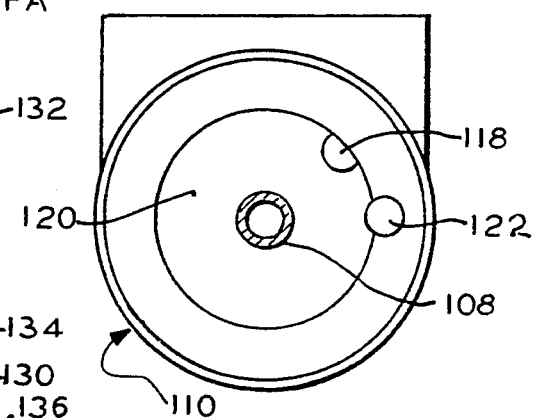
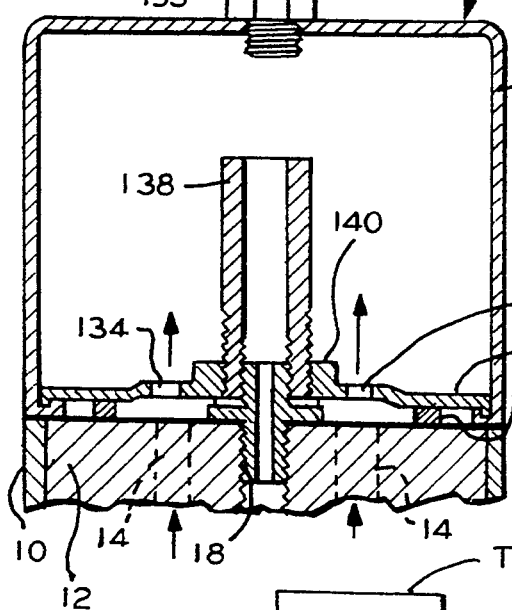
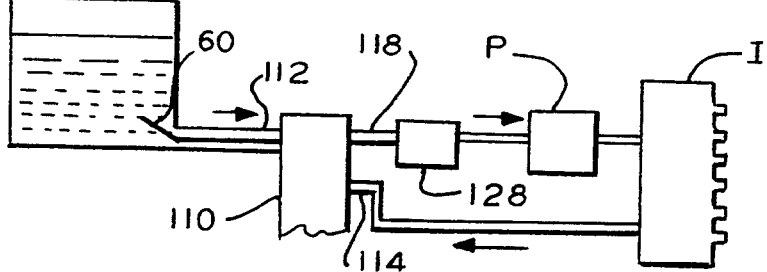

FUEL PROCESSING UNIT

The present invention relates to fuel heating and dewatering and, in particular, to a processing unit having a combined fuel heater and settling chamber.

Fuel from a tank can become contaminated with particles and water condensate. On cold days, water in the fuel can form crystals that clog a fuel filter. Also crystals can accumulate and cause blockage at turns in the fuel line, especially at elbow fittings. Also, some fuels, such as diesel fuel, have paraffins that so thicken the fuel on cold days that the fuel will not flow through a fuel filter or a fuel pump. These various difficulties can prevent the vehicle engine from starting.

In U.S. Pat. No. 4,428,351 a fuel filter can be mounted internally or externally to a housing. The housing has a heater loop heated by a hot engine coolant from, for example, the vehicle radiator. The heater loop is mounted in a lower chamber to melt ice crystals and to allow water to settle. This patent shows a horizontal plate separating the lower chamber from an upper chamber containing an internal fuel filter. The horizontal plate has a narrow annular gap between its outer edge and the inside of the housing. This narrow gap concentrates the fuel flow so that portions of the heater tube near the gap can heat the fuel flow. A disadvantage with a fuel heater unit of this type is that the heating only takes place within the housing. Freezing external to this unit is not affected. U.S. Pat. No. 4,368,716 shows a related unit with a transparent section. See also U.S. Pat. Nos. 4,421,090; 4,495,069; 4,539,109; and 4,612,897.

In U.S. Pat. Nos. 4,676,895 and 4,680,110 a cup shaped baffle encircles a fuel filter. Incoming fuel flows down around the outside of the baffle before turning into the baffle and entering the fuel filter. Again, a heater tube is brought near the filter to heat the fuel entering the filter. This assembly also lacks a mechanism for heating fuel upstream of the assembly.

U.S. Pat. Nos. 4,502,955 and 4,976,852 show fuel filters with elongated heaters. These heaters are contained within the filter assembly and do not operate to warm the fuel upstream of the assembly.

U.S. Pat. No. 4,264,442 shows a combined fuel heater and water trap having a foraminous sidewall through which wet fuel passes. This reference however does not show a means for heating fuel upstream of the assembly. See also U.S. Pat. Nos. 4,059,520; 4,329,226; 4,354,946; 4,443,334; 4,629,560; 4,866,250; 4,878,536.

Accordingly, there is a need for a combined heater and settling chamber that can warm fuel upstream of the assembly, as well as provide for more efficient separation of water inside the assembly.

SUMMARY OF THE INVENTION

In accordance with the illustrative embodiments demonstrating features and advantages of the present invention, there is provided a fuel processing unit for dewatering and heating fuel before delivery to a filter. The unit includes a housing with a settling chamber and an inlet communicating with the chamber. This housing has a filter connection means adapted to connect the filter in series with the chamber. The unit also includes a heater cable having a predetermined length. The heater cable extends from the chamber through the inlet and outside the housing.

In a related embodiment of the same invention, another fuel processing unit can also dewater and heat fuel before delivery to a filter. Its housing also has a settling chamber and an inlet communicating with the chamber. Again, the housing has a filter connection means adapted to connect the filter in series with the chamber. The unit includes a plurality of foraminous baffles mounted in the housing downstream of the inlet and the chamber for diverting fuel flow and enhancing dewatering.

A related method according to the same invention employs a heater cable and settling chamber for dewatering and heating fuel from a fuel line before delivery to a filter. The method includes the step of connecting the settling chamber downstream of the fuel line. Another step is routing the heater cable from the chamber through the fuel line.

By employing such apparatus and methods, highly efficient heating and dewatering of fuel is achieved. In the preferred embodiment a housing has a heater cable that extends from inside the housing through a settling chamber and out the fuel inlet of the housing. The cable may be of such a length that most of the heater cable resides outside the housing. In preferred embodiments, the heater cable reaches the fuel tank so that fuel can be heated along the entire length of the fuel line from the fuel tank to the housing.

Preferably a spaced plurality of annular, parallel baffles are located within the settling chamber. Wet fuel entering the housing is delivered to the chamber below the baffles in proximity to a main heater loop. The baffles are perforated or foraminous and require the fuel to follow a tortuous path. This increases the residence time inside the assembly and facilitates water separation. The water, being heavier, tends to separate at the baffles and descend to the bottom of the chamber.

In one constructed embodiment, a feeder pipe is connected to the underside of a header mounted at the top of the housing. There, the foraminous baffles are mounted around the feeder pipe. The preferred header also has a return port that can deliver excess fuel returning from the fuel injectors of the vehicle engine to the housing inlet for reprocessing. This header also has a plurality of bores bordering the feeder pipe connection so that dewatered and heated fuel can pass through the header, upwardly to the inlet of a spin-on type filter. The center of the spin-on filter has an outlet, which threads atop a fitting in the center of the header to communicate with a side outlet in the header.

In alternate embodiments, the filter is not mounted directly on the housing, but the header has fittings that connect the housing to an external downstream filter.

In a preferred embodiment, a heater cable has a resistive wire surrounded by an insulator inside a grounded conductive sheath. Accordingly, current flows through the central resistive wire and returns through the sheath. This heater cable is made thin enough to be threaded through a fuel line without impeding fuel flow.

The preferred apparatus has oblique elbow fittings with, for example a 135° bend (45° deflection). Oblique fittings are useful to turn the heater cable without excessive bending. Because the heater cable is only deflected 45°, the cable is not unduly stressed even if the fitting is rotated when installed.

Preferably, the heater cable is assisted by a main heater located inside the settling chamber. Preferably, the main heater and heater cable are regulated by a thermostat mounted to protrude into the settling chamber.

Preferably, the holes in the baffles are punched to have jagged edges or barbs. Also, the downstream side of these holes opposite the barbs have a funnel-like shape. Accordingly, the baffles can be oriented with the barbs projecting upstream. Accordingly, particles flowing towards the barbs can be trapped and do not clog the downstream filter or other components. Also, the funnel-like shape on the downstream face of the baffle allows particles that have ascended past the baffle to resettle when the fuel flow is interrupted back towards the settling chamber.

BRIEF DESCRIPTION OF THE DRAWINGS

The above brief description as well as other objects, features and advantages of the present invention will be more fully appreciated by reference to the following detailed description of presently preferred, but nonetheless illustrative embodiments, in accordance with the present invention when taken in conjunction with the accompanying drawings, wherein:

FIG. 11 is an axonometric view of a header that is an alternate to that shown in FIG. 1;

FIG. 12 is a cross-sectional view taken along line 12—12 of FIG. 11 and showing the header mounted in the housing;

FIG. 13 is a bottom view of the header of FIG. 11;

FIG. 14 is a schematic block flow diagram showing the connection of the unit of FIG. 12 in a typical fuel system; and FIG. 15 is an axial sectional view of a filter that is an alternate to that of FIG. 2.

DETAILED DESCRIPTION OF THE PREFERRED EMBODIMENTS

Figure 1:
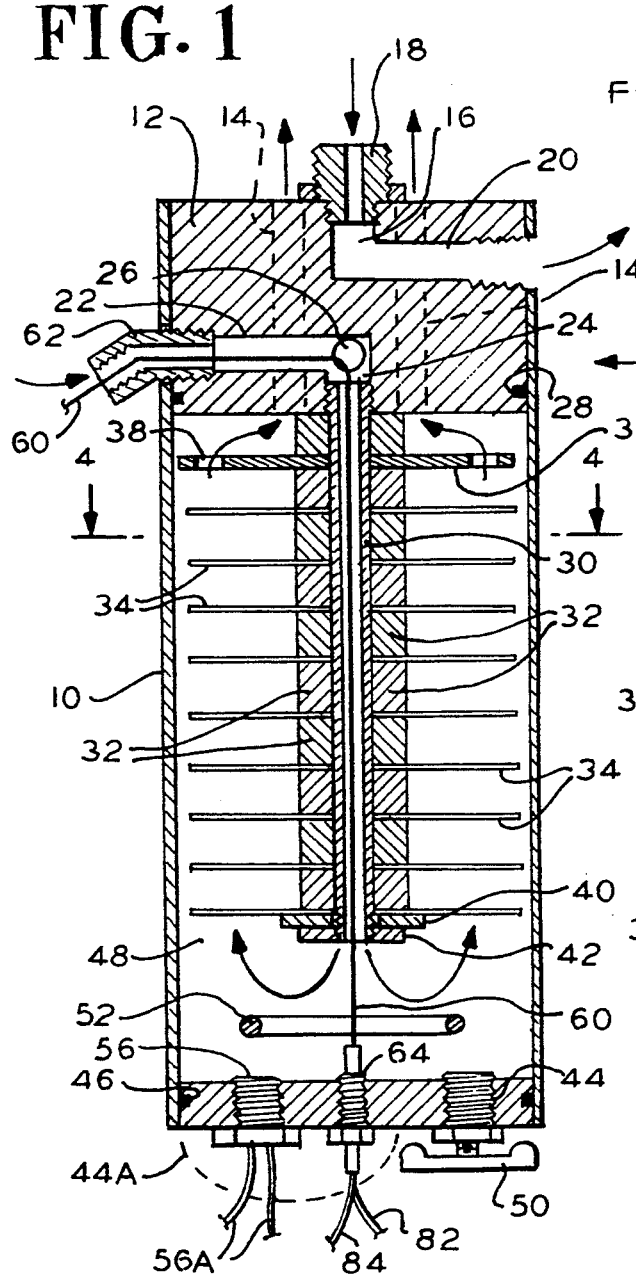
FIG. 1 is a sectional, elevational view of a unit, taken along its axis, which is constructed in accordance with the principles of the present invention.

Referring to FIGS. 1-5, housing 10 is shown as a hollow, transparent plastic cylinder. In one constructed embodiment, housing 10 was 11¾" (29.8 cm) long and 4½" (11.4 cm) in diameter with a wall thickness of ¼" (0.63 cm), although these dimensions can be varied depending upon the desired efficiency, capacity, strength, flow volume, etc. Housing 10 can be made of Lexan, Plexiglass or other materials that have adequate durability and insensitivity to the fluids being handled. Preferably, the housing is transparent but in some embodiments the housing may be opaque or one or more transparent windows may be mounted in the housing. While the housing is shown being cylindrical, in some embodiments the overall shape may be frusto-conical, hemispherical, ovoid, prismatic or have other shapes.

Mounted within the top of housing 10 is a cylindrical header 12 that is 2¾" (7 cm) tall and made of a molded plastic machined in the appropriate fashion, although in some embodiments the header can be a metal such as aluminum. Header 12 has four, spaced, ½" (1.27 cm) diameter bores 14 running the full height of header 12. The upper end of bores 14 are herein referred to as filter feed ports. These four vertical bores shown spanning the header may be changed to a greater or lesser number of vertical bores and in some embodiments only one bore will be employed.

Bored about ⅓ of the way into the top center of header 12 is a filter discharge port 16 whose upper end is threaded to receive a filter mounting means, shown herein as a union 18 with a hexagonal collar. Port 16 intersects and communicates with a radially bored outlet 20, which communicates through the side of header 12 and housing 10. A radially bored inlet 22 communicates through a hole in housing 10 and the side of header 12 to reach a concentric, vertical outflow port 24 that communicate through the lower face of header 12. A return port is shown herein as a bore 26 communicating with port 24 and extending radially at right angles to inlet 22. The outer ends of inlet 22, outlet 20 and ports 24 and 26 are internally threaded to receive appropriate fittings.

Header 12 has near its lower edge an annular groove holding an O-ring 28 to a seal housing 10 to header 12. Header 12 may be secured inside housing 10 by an appropriate cement, although in other embodiments screws, bolts and other clamping means may be used instead.

A 7" long (17.8 cm) feeder pipe 30 has one of its two externally threaded ends screwed into threaded port 24 to reach down to chamber 48 in housing 10. Feeder pipe 30 may be a steel pipe with a ½" (1.27 cm) inside diameter and a ¾" (1.9 cm) outside diameter, although pipes of different sizes and materials may be used instead. Pipe 30 is encircled by ten separate spacers 32 that are interleaved with a plurality of nine diffuser baffles 34 (baffles 34 are also referred to as foraminous diffusers). An uppermost baffle 36 is shown as a plastic disc having eight, equiangularly spaced, peripheral holes 38. The baffles 34 and 36, as well as spacers 32 are held in place on feeder pipe 30 by a washer 40 and nut 42 threaded onto the lower, externally threaded end of feeder pipe 30. Spacers 32 have in one constructed embodiment an outside diameter of 1½" (3.81 cm) and are made of aluminum; although plastic, ceramics and other materials may be used instead.

The baffles 34 are preferably made of a sheet metal, such as steel or aluminum having a large number of diverging holes or perforations 34A. Perforations 34A can be punched in baffle 34 by an appropriate die (not shown) having a multiplicity of pointed mandrels. The upstream side of the perforation is designed to be jagged and have the barbs 34B illustrated in FIG. 5, for the purpose to be described presently. In some embodiments, the baffles may be in the form of a wire mesh, a fabric or other foraminous material to produce the water separation described herein. In some embodiments, the baffles may be arranged with impenetrable sections so the majority of the fuel flow will be diverted through some minimum angle. In other embodiments, baffles will be interdigitated to provide a zig zag flow path to enhance water separation. This flow path can be accomplished by providing perforations on alternate holes of the baffles so that the flow path repeatedly changes direction. While ten baffles are illustrated, in different embodiments a greater or fewer number of baffles may be used. Also, the number of holes in the baffles may be greater or smaller, depending upon the degree of separation and filtering desired in this system.

Glued or otherwise secured within the bottom of housing 10 is a base disc 44, having an annular groove, holding O-ring 46. The space between the header 12 and the base disc 44 is herein referred to as a settling chamber 48. Settling chamber 48 can be drained by a removeable drain means, shown herein as a threaded plug 50 mounted in a tapped bore in base disc 44.

The electrical connections on thermostatic means 56 and on the electrical stud 64 of heater cable 60 are shown encapsulated in a mass of potting compound 44A. It will be appreciated that the potting compound can be formed around more or fewer electrical connections. The potting compound enhances the structural integrity of the electrical connections and avoids corrosion by chemicals, moisture etc.

Figure 2:
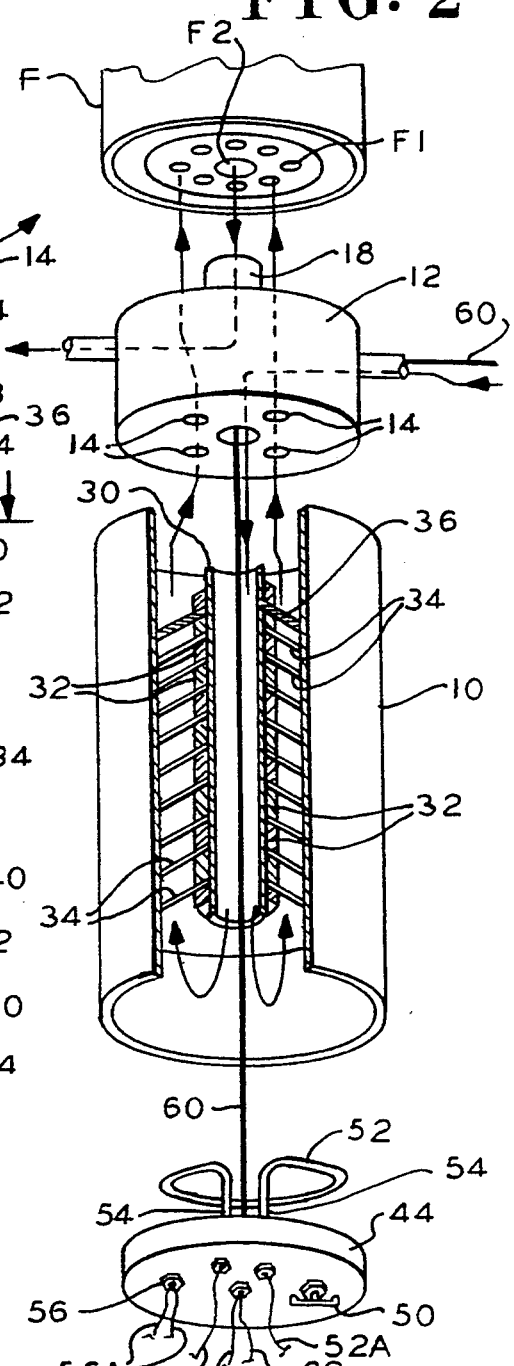
FIG. 2 is an exploded axonometric view of the unit of FIG. 1.

A conventional spin-on type fuel filter F is shown in FIG. 2 aligned to be threaded onto threaded, filter discharge fitting 18. In a conventional fashion, fuel flowing upwardly through bores 14 can enter the matching plurality of peripheral holes F1 on filter F to be filtered and then discharged through the center hole F2 into fitting 18.

A heating means is shown herein as an electrical heating loop 52 that is mounted on a pair of stanchions 54, to base disc 44. Stanchions 54 have threaded lower ends that are bolted into position on base disc 44. Wires 52A are shown emerging from stanchions 54 for the purpose of powering electrical heating coil 52. In one constructed embodiment, heater 52 was 3⅛" (7.9 cm) in diameter and had an overall length of 14" (35.6 cm). The heater coil itself is about ⅜" (0.95 cm) in diameter and is sheathed with an incoloy material. The stanchions 54 have ceramic insulators, a brass bulk head and brazed construction. Heater 52 was rated at 165 watts at 12 volts for delivering 18 watts per square inch. It will be appreciated, however, that other sizes, shapes, ratings and materials may be used for heater 52. Furthermore, in some embodiments, heater 52 may be eliminated where adequate heating is provided by other structure to be described presently. In still other embodiments the main heater may be powered not electrically but by a heated fluid such as engine coolant. Also, instead of an internal heater element, heat can be applied through the housing wall or by a heat exchanger mounted in the housing wall.

A thermostatic means is shown herein as a threaded stud 56 having a hexagonal head and a pair of leads 56A. Thermostatic means 56 had in one constructed embodiment a ½" (1.27 cm) threaded body and was rated for 30 amps at 12 volts D.C. The preferred thermostat is normally open and has a snap switching action to close at 40° F. and open at 60° F. While the thermostat is shown regulating fuel in the settling chamber to a temperature of between 40° and 60° F., in other embodiments employing different flow rates or fuels, a different temperature range may be imposed.

A heater cable 60 is shown routed from the outside of housing 10 through a fitting 62 (FIG. 1), through inlet 22, down feeder pipe 30 to a threaded connection stud 64. Obtuse elbow fitting 62 has a 135° passage, that is, a passage that makes a 45° turn. This fitting 62 reduces the amount of bending that must be applied to heater cable 60. With the modest turn through fitting 62, the amount of bending the cable 60 undergoes if threaded through the fitting 62 is kept relatively small. In instances where fitting 62 must be threaded into header 12 with cable 60 installed, the amount of bending is limited to a conical angle of 45°.

Figure 6:
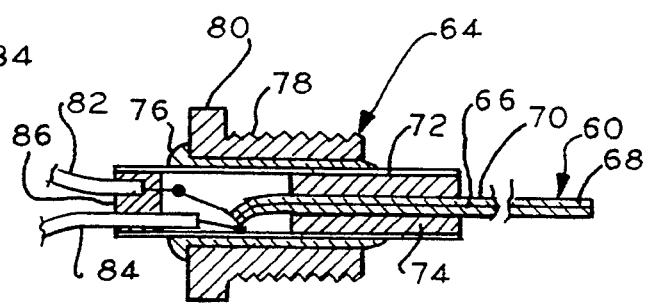
FIG. 6 is an axial sectional view of one end of the heater cable of FIG. 1.

Referring to FIG. 6, cable 60 is preferably made of a central, high temperature, resistance wire 66 insulated by a magnesium oxide sleeve 68, all mounted coaxially within an incoloy steel sheath 70. The assembly is drawn or swaged to final size to give high density insulation for maximum heat transfer efficiency. Sheath 70 is preferably 0.093" (0.24 cm) in diameter and cable 60 is preferably 5' long (1.52 m), although the actual sizes will depend upon the power rating and the size of the fuel line to be heated, as will be described presently.

Cable 60 is mounted inside a steel tubular casing 72. Casing 72 in one constructed embodiment was 1¼" (3.175 cm) long and 5/16" (0.8 cm) in diameter, although other dimensions are contemplated. Heater wire 66 is shown extending out of sheath 70 and soldered to the exposed wire in a Teflon coated lead 82. Another Teflon coated lead 84 has its exposed wire extending to a common soldered joint with the sheath 70 and the casing 72. The leads 82 and 84 are shown embedded in an epoxy bed 86. Casing 72 is secured in an epoxy bed 76 inside a threaded bushing 78 having a hexagonal head 80. In one contemplated embodiment the thermostat 56 (FIG. 1) can be eliminated and a functionally equivalent thermostat mounted inside casing 72.

In one constructed embodiment, heater cable 60 was rated at 65 watts at 12 volts D.C. to conduct 5.4 Amps. The effective resistance of the heater cable 60 is 2.2 Ohms. It will be appreciated that the power rating of the heater cable will vary with the length of the heater cable, the size of the fuel line to be heated, as well as the expected temperature extremes in the relevant climate. Also the relative ratings of the heater cable and the heater coil will be changed depending upon the size of the unit and the percentage of preheating to be done by the heater cable.

Figure 7:
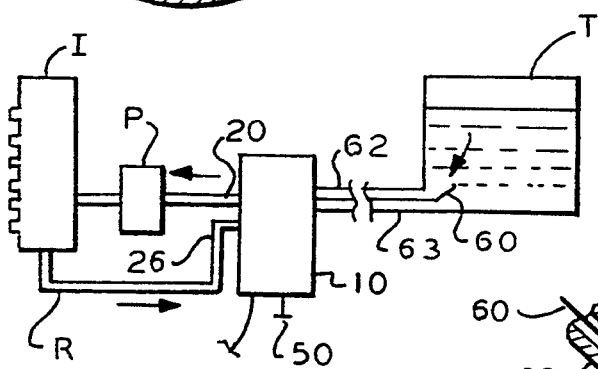
FIG. 7 is a schematic block diagram showing a system in which the unit of FIG. 1 may operate.

Referring to the motor vehicle system of FIG. 7, housing 10 of the previously illustrated fuel processing unit is shown with its inlet 62 connected to a fuel line 63 supplied from a fuel tank T. Tank T may be filled with gasoline, diesel fuel or other appropriate fuel. Heater cable 60 is shown emerging through fitting 62 to run along fuel line 63 and emerge inside tank T. The outlet 20 of housing 10 is shown connecting through fuel pump P to fuel injectors I. (Alternatively, pump P may feed a carburetor of a vehicle engine.) Injectors are shown having a return line R for returning unconsumed fuel to previously illustrated return port 26.

Figure 8:
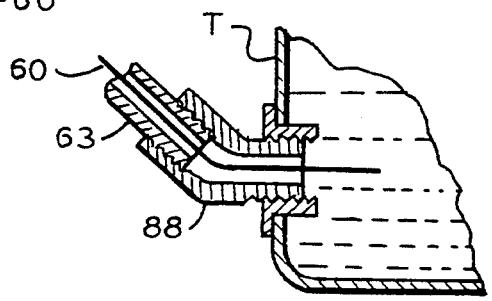
FIG. 8 is a detailed cross-sectional view of the connection to the fuel tank of FIG. 7.

Referring to FIG. 8, previously illustrated fuel line 63 is shown connecting to obtuse elbow fitting 88. This fitting 88 has a passage that turns 45° to reduce the amount of bending of heater cable 60. Heater cable 60 is shown reaching inside tank T.

Figure 9:
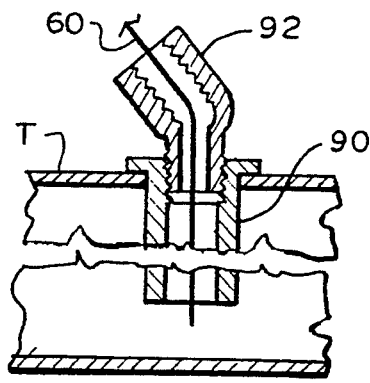
FIG. 9 is a detailed cross-sectional view of an alternate top connection to the fuel tank of FIG. 7.

Referring to FIG. 9, tank T is shown with an eductor tube 90 connected by an upper flange atop tank T. The upper end of tube T is internally threaded to receive an obtuse elbow fitting 92, which again makes a 45° turn to reduce the amount of bending stress applied to heater cable 60, although the preferred cable is able to bend at a radius of 3/16" (0.48 cm).

Figure 10:
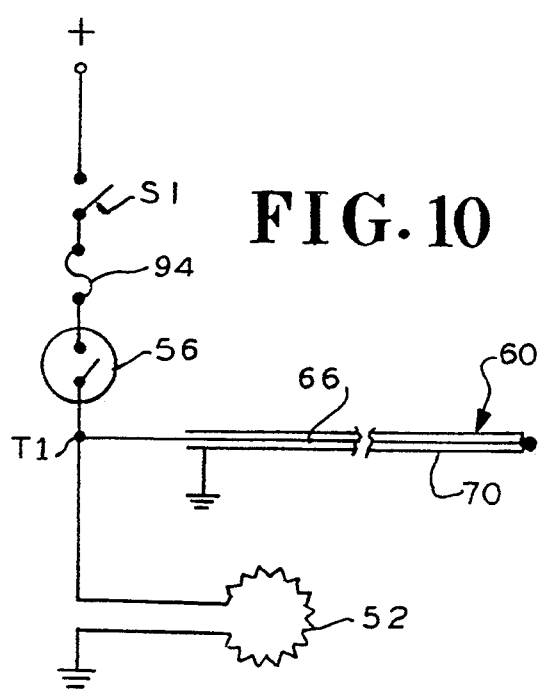
FIG. 10 is a schematic electrical diagram for the heater cable and main heater in the unit of FIG. 1.

Referring to FIG. 10, previously mentioned heater 52 and heater cable 60 are shown connected in parallel between terminal T1 and ground. The central heater wire 66 is shown connected to terminal T1 while its sheath 70 is grounded. Terminal T1 is shown serially connected through previously illustrated thermostatic means 56, circuit breaker 94 and ignition key switch S1 to positive potential, e.g. 12 V. In one constructed embodiment, breaker 94 was rated at 25 Amps. In other embodiments, the heater cable can be constructed differently. For example, one can use a pair of insulated heater wires with a sheath holding them together. These alternate heater wires can be Teflon coated, solid Alomega, 0.030 inch in diameter, 20 AWG, at 0.20 Ohms/foot.

Referring to FIGS. 11 through 13, an alternate embodiment is shown wherein the previously illustrated header (header 12 of FIG. 1) is replaced with alternate header 100. Alternate header 100 may be a plastic or metal disc having four equiangularly spaced, axially aligned bores 102 extending through the full height of header 100. Bores 102 extend to an annular concentric groove 104 cut into the top of header 100. Thus, the interior of chamber 10 can communicate with concentric groove 104.

Header 100 has a concentric, axial, tapped bore 106 extending through the full height of header 100. Previously illustrated feeder pipe 30 is shown threaded into the bottom of tapped bore 106 with spacer 32 encircling pipe 30. The balance of the structure below the illustrated components can be identical to that illustrated in connection with FIG. 1. The upper end of tapped bore 106 is fitted with a union 108 that also threads into the central bore of manifold 110 to communicate with its internally threaded collar 112. Collar 112 communicates with a return port 114 in boss 116.

Radially spaced from central collar 112 is outlet collar 118 which communicates with the annular recess 120 on the underside of manifold 110, as well as the annular groove 104 in header 100. A threaded fill hole 122 bored in manifold 110 is capped by a threaded stud 124. Both collar 118 and fill hole 122 are shown communicating with recess 120 and therefore annular groove 104.

A pair of molded lugs 126A and 126B are shown molded to manifold 110. Holes in lugs 126A and 126B may be used to mount plate 110 to the vehicle frame to support plate 110 and the structure mounted underneath it.

Referring to FIG. 14, manifold 110 is shown connected in a system employing a tank T, similar to that previously illustrated. Heater cable 60 is shown emerging from manifold 110 to pass through collar 112 and along the fuel line into tank T. The outlet collar 118 of manifold 110 is shown connecting through a filter 128. In this instance, filter 128 may be similar to that previous described but will be separated from the assembly illustrated in FIGS. 11-13. The outlet of filter 128 connects through fuel pump P to fuel injectors I. The return line of injector block I is shown connected to return inlet 114 or to fuel tank T, for some applications.

Referring to FIG. 15, previously mentioned housing 10 and header 12 is shown with threaded union 18. An empty settling canister FA is shown with a mounting plate 130 supporting a canister 132, having a ½ inch hex head plug for filling the canister. Plate 130 has a plurality of circumferentially spaced holes or input ports 134 that communicate with previously mentioned header bore 14. Plate 130 is sealed to header 12 by annular gasket 136. An internal, upright, drain tube 138 is externally threaded on its lower end and is threaded into internally threaded, annular boss 140 in plate 130. Thus tube 138 communicates with union 18 and its discharge port. Canister 132 has a threaded hex plug 133 that can be removed for filling canister 132 with fuel.

Figure 3:
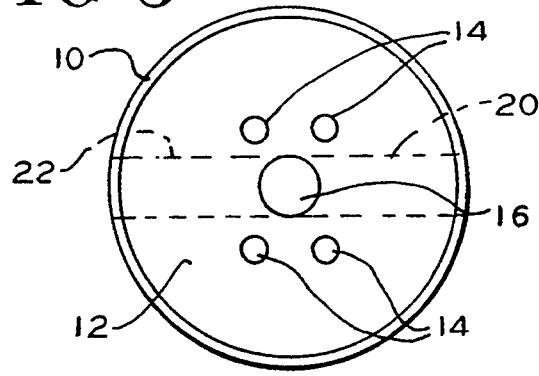
FIG. 3 is a top view of the unit of FIG. 1 with its upper fitting removed.
Figure 5:
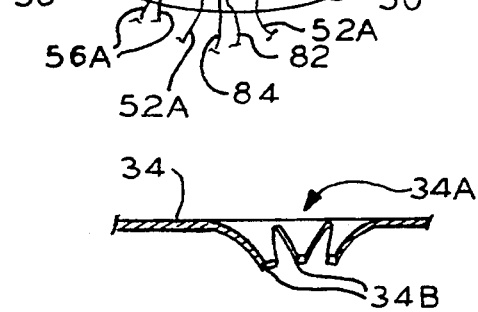
FIG. 5 is a detailed cross-sectional view taken through the center of one of the holes of the baffles of FIG. 4.
Figure 4:
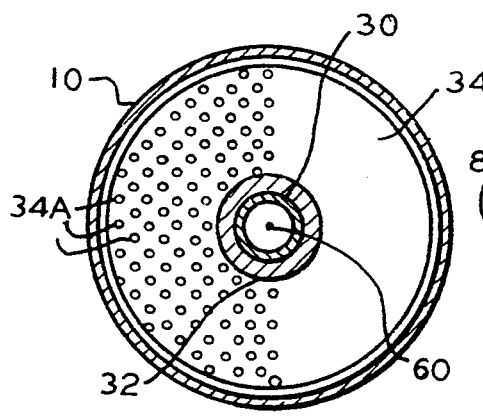
FIG. 4 is a cross-sectional view taken along line 4—4 of FIG. 1.

Header 12 is mounted at an upper portion of the housing 10. Header 12 has the previously mentioned outlet 20 (FIG. 3), and on its topside a feed port 14 and a discharge port 16 (FIG. 3). This discharge port 16 communicates with the outlet 20. Outlet 20 is adapted to communicate with a filter (shown hereinafter). The filter is spaced from this unit. Settling canister FA is mounted atop header 12 and has (a) an input port 134 communicating with the feed port 14, and (b) an internal, upright, drain tube 138 communicating with the discharge port 16.

To facilitate an understanding of the principles associated with the foregoing apparatus, its operation will be briefly described in connection with the embodiment of FIGS. 1-10. Housing 10 may be installed in a motor vehicle as schematically illustrated in FIG. 7. In some embodiments a return line R is unnecessary in that the fuel injector block I may be replaced with a carburetor. Alternatively, return line R can return to the fuel tank in some applications.

Fuel within tank T tends to thicken as paraffins within the fuel begin to solidify. Also, water condensate can mix with the fuel and form ice crystals. These ice crystals can collect at elbow joints or bends in the fuel lines where centrifugal force separates the crystals and causes them to collect. Furthermore, ice crystals in the fuel may clog filter F (FIGS. 1 and 2). Accordingly, the fuel in tank T may not flow freely enough.

The system may be operated by applying power to heater 52 (FIGS. 1 and 2) as well as heater cable 60. The power is applied by rotating the ignition switch S1 (FIG. 10 to the accessory position. With heat applied to cable 60 throughout the fuel line between tank T and housing 10, fuel is relatively warm and flows freely into housing 10. Ice crystals suspended in the fuel flowing through a turn such as the 45° degree fitting 88 of FIG. 8 tend to collect and block the fuel passage. The ice crystals tend to be propelled outwardly by centrifugal force to collect in the outside corner of the fittings. As fuel continues to flow, the ice crystals tend to accumulate and eventually block the fitting. However, heater cable 60 continuously applies heat to the fitting so that ice build up and clogging is prevented.

Fuel from the tank flows into fitting 62 and into inlet 22 (FIG. 1). The fuel continues to flow down through feeder pipe 30 and into settling chamber 48.

Fuel having ice crystals or solidified paraffin reaching chamber 48 will be heated by relatively large heater coil 52. The temperature of fuel in chamber 48 will be regulated by thermostat 56. Thermostat 56 will switch the current through heater cable 60 and heater coil 52 to maintain the temperature in chamber 48 in a range of 40° to 60° F.

Chamber 48 is relatively large so the flow velocity is low. This provides an opportunity for the relatively heavy water to settle toward the bottom of chamber 48. In addition, the reversal of direction indicated at the lower outlet of feeder pipe 30 produces a centrifugal force tending to downwardly separate water.

Additionally, any water attempting to move upwardly must take a relatively tortuous path through the nine baffles 34 as well as upper baffle 36. Fuel and traces of water will thus tend to follow a slow, upwardly wandering path around the baffles 34, 36. This tortuous path tends to separate water which then migrates downwardly as fuel migrates upwardly.

Also, particles, including ice crystals, will tend to be trapped by the barbs 34B (FIG. 5) around the holes 34A. Also, when fuel flow later stops, particles entraped in barbs 34B tend to fall downwardly and are funnelled into the diverging upper mouth of hole 34A. Thus particles will have a tendency to migrate downwardly, and will be impeded from upward progress.

Fuel passing through the final baffle 36 passes through holes 38 and enters the four bores 14 in header 12. The fuel then reaches the eight peripheral feed holes F1 (FIG. 2) in filter F. The fuel is thereby filtered in a conventional manner and returns through outlet F2 to fitting 18. From fitting 18, the heated, dewatered, and filtered fuel passes through outlet 20 (FIG. 1) to be pumped through pump P (FIG. 7). The processed fuel is delivered to injectors I of the vehicle engine, which is then able to operate in a normal fashion. Excess fuel, unused by the injectors I, returns along line R to the return port 26 to be recycled into the inlet of the unit of FIGS. 1 and 2.

Some embodiments will employ empty canister FA (FIG. 15) instead of filter F. In such embodiments canister FA acts as a supplementary settling chamber. Heated and dewatered fuel enters canister FA through holes 134 from bores 14. The interior of can 132 is relatively spacious so the fuel moves slowly and particles can readily settle. Particles will not easily flow into tube 138 because of its height.

The apparatus of FIGS. 11-13 will operate similarly, except that its filter is a separate, external unit. As illustrated in FIG. 14, after being treated and passed through manifold 110, fuel proceeds through collar 118 to an external fuel filter 128 before being pumped through pump P to injector block I. As before, return fuel can connect to port 114 to be recycled.

It is to be appreciated that various modifications may be implemented with respect to the above described preferred embodiment. While 45° fittings are shown herein, in some embodiments straight fittings will be used instead, in which case the heater cable will not be bent at all. In other embodiments, no return port or return line will be used if there is no need for one. Also, in some embodiments the settling chamber may be fed by a lower inlet, in which case there is no need for a passage through a vertical feeder pipe. Additionally, the size and volume of various components can be altered depending upon the desired flow rate, volume and capacity of the unit. Also, the various materials described herein may be replaced with metals, plastics, ceramics depending upon the desired strength, wear resistance and immunity to reaction with the fuel.

Obviously, many modifications and variations are possible in light of the above teachings. It is therefore to be understood that within the scope of the appended claims, the invention may be practiced otherwise than as specifically described.

I claim:

1. A fuel processing unit for dewatering and heating fuel before delivery to a filter, comprising:

a housing having a settling chamber and an inlet communicating with said chamber, said housing having a filter connection means adapted to connect said filter in series with said chamber;

a heater cable having a predetermined length and extending from said chamber through said inlet and outside said housing; and a diffuser baffle mounted in said chamber for diverting fuel flow and enhancing dewatering, said chamber having a top and an upper portion, said diffuser baffle being mounted in said upper portion of said chamber.

2. A fuel processing unit according to claim 1 wherein the majority of the length of said heater cable is located outside said housing.

3. A fuel processing unit according to claim 2 wherein the chamber has a lower portion and wherein the majority of the length of said heater cable is located outside said housing, said unit comprising:

a heating means mounted in said chamber and spaced from said heater cable for electrically heating said chamber, said heating means being formed into an electrical heating loop in said lower portion of said chamber.

4. A fuel processing unit according to claim 2 comprising:

thermostatic means coupled to said heater cable for regulating the temperature inside said chamber.

5. A fuel processing unit according to claim 1 wherein said heater cable comprises:

an electrically conductive sheath; and a heater wire coaxially mounted inside said sheath.

6. A fuel processing unit according to claim 5 wherein said housing has a return port communicating with said inlet.

7. A fuel processing unit according to claim 1 wherein said heater cable delivers thermal energy and the thermal energy delivered in total, both inside and outside said chamber, is at least 25 watts thermal energy.

8. A fuel processing unit according to claim 1 wherein said baffle is foraminous.

9. A fuel processing unit according to claim 1 comprising:

a feeder pipe mounted in said housing to communicate between said inlet and said chamber.

10. A fuel processing unit according to claim 9 wherein said diffuser baffle comprises:

a spaced plurality of diffuser baffles mounted in said chamber around said feeder pipe for diverting fuel flow and enhancing dewatering; and a plurality of annular spacers encircling said feeder pipe and being interleaved with said baffles for spacing them.

11. A fuel processing unit according to claim 1 comprising:

a heating means mounted in said chamber and spaced from said heater cable for internally heating said chamber.

12. A fuel processing unit according to claim 11 wherein said heating means is sized to deliver more heat to said chamber than said heater cable.

13. A fuel processing unit according to claim 1 comprising:

an obtuse elbow fitting mounted on said inlet for deflecting said cable to form an obtuse angle.

14. A fuel processing unit according to claim 1 wherein said housing has an upper section, said unit comprising:

a header mounted at said upper section of said housing, said header having a topside, and an outlet, a filter feed port and a filter discharge port on said topside, said filter feed port communicating with said chambers, said filter discharge port communicating with said outlet, said header being adapted to externally mount said filter over said housing.

15. A fuel processing unit according to claim 1, wherein said housing has an upper section, said header having a topside, said unit comprising:
- a header mounted at said upper section of said housing, said header having an outlet, and a feed port and a discharge port on the topside of said header, said feed port communicating with said chamber, said discharge port communicating with said outlet, said outlet being adapted to communicate with said filter, said filter being spaced from said unit; and
- a settling canister mounted above said header and having (a) an input port communicating with said feed port, and (b) an internal, drain tube communicating with said discharge port.

16. A fuel processing unit for dewatering and heating fuel before delivery to a filter, comprising:
- a housing having an upper section, a settling chamber and an inlet communicating with said chamber, said housing having a filter connection means adapted to connect said filter in series with said chamber;
- a heater cable having a predetermined length and extending from said chamber through said inlet and outside said housing; and
- a header mounted at said upper section of said housing, said header having a topside, an outlet, a filter feed port and a filter discharge port on said topside, said filter feed port communicating with said chamber, said filter discharge port communicating with said outlet, said header being adapted to externally mount said filter over said housing.

* * * * *